UNITED STATES PATENT OFFICE.

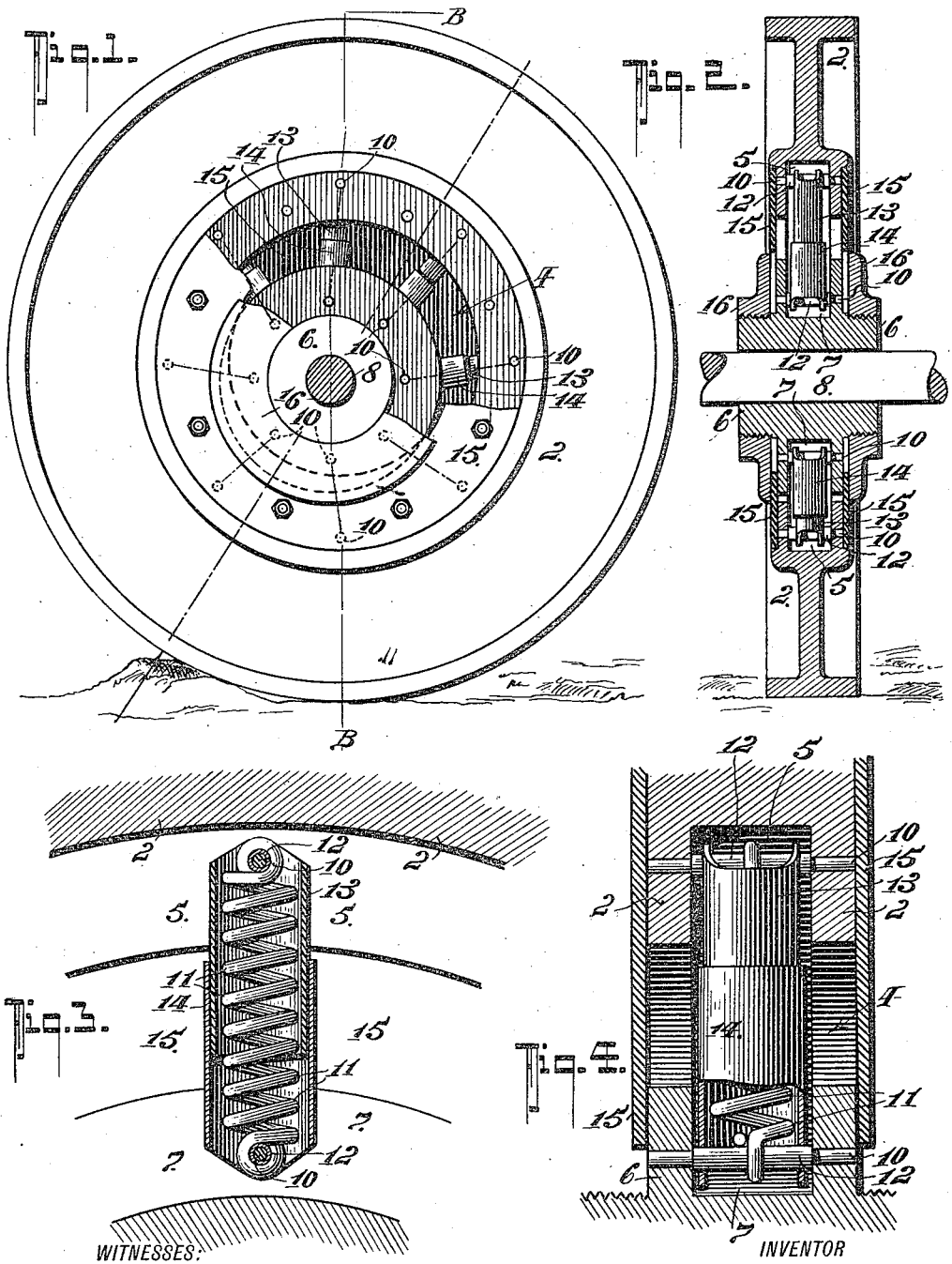

CHARLES WARWICK, OF VANCOUVER, BRITISH COLUMBIA, CANADA.

SPRING VEHICLE-WHEEL.

1,081,415.  Specification of Letters Patent.  Patented Dec. 16, 1913.

Application filed August 20, 1912. Serial No. 715,970.

*To all whom it may concern:*

Be it known that I, CHARLES WARWICK, citizen of the Dominion of Canada, residing at Vancouver, in the Province of British Columbia, Canada, have invented a new and useful Spring Vehicle-Wheel, of which the following is a specification.

This invention relates to a spring wheel which has been designed as a substitute for the pneumatic tire commonly used on the wheels of self-propelled vehicles.

The invention comprises the suspension of the hub of the wheel within the wheel proper on a series of springs the ends of which are so connected to the main body of the wheel and to the hub as to permit the hub perfect freedom of movement in the plane of rotation. In the use of springs so connected I am enabled to employ them in both compression and tension.

The invention also comprises the manner of slidably fitting the hub within the wheel so as to support the wheel laterally and permit perfect freedom of movement in the plane of rotation and exclude dust from the operative parts.

The invention is particularly described in the following specification, reference being made to the drawings by which it is accompanied, in which:

Figure 1 is a side elevation of the wheel with a portion of the cover plate removed. Fig. 2 is a vertical section on the line B. Fig. 3, an enlarged detail of a spring and its casing as connected between wheel and hub, and Fig. 4, a cross view and part section of the same.

In these drawings 2 represents the body of the wheel proper, the rim of which may be integral with it or of any suitable material attached. This wheel 2 has a central aperture 4 for the reception of the hub 6 and its sustaining springs. Around the central aperture 4 the thickness of the wheel is enlarged and its underside is provided with an annular groove 5; and the hub 6, which may be secured to or free on the axle 8, is provided with a similar groove 7.

Mounted on pins 10 within the groove 5 of the wheel and 7 of the hub, are springs 11, the ends of the springs being secured upon bearing tubes 12 through which the pins 10 pass, so that an ample wearing surface is afforded on the pins. It is designed that no initial tension shall be imposed upon the springs 11 other than that due to the load, so that in use the springs in the upper part of the wheel will be under tension and those in the lower part under compression. In order to prevent the springs bending when under compression, they are inclosed within telescopically slidable tubes 13 and 14, each secured to one of the end bearing tubes 12.

The central aperture 4 within which the hub of the wheel is spring sustained, is closed by cover plates 15 secured by bolts or rivets to the body of the wheel 2, and the boss 6 is carefully fitted to slidably fit between the plates. On the ends of the hub 6 are threaded washer plates 16, which may be tightened up upon the cover plates 15 so as to maintain a loose slidable fit. So constructed, the hub 6 is free to move in any direction within the wheel 2 in the plane of rotation, the spring connections being such that they will all yieldingly support the hub within the wheel and the fit of the cover plate between the faces of the hub and the washer plates will prevent the intrusion of dust.

The central aperture of the wheel between it and the hub may be filled with an anti-friction composition, such as vaseline and graphite, which will insure effective lubrication of all moving parts and will seal the interior against dust.

I am aware that various attempts have been made to support the hub of a wheel within its rim by means of springs, but in all with which I am acquainted the springs have not been free to support the wheel by their compression and tension, or they have been so applied that the springs were racked adjacent to a horizontal line through the axis of the wheel.

The wheel, as illustrated in this application, is shown with a limited number of springs only, but in use the springs will be as close together as practicable, making allowance for the angling from their true radial position, while in use.

Having now particularly described my invention, I hereby declare that what I claim as new and desire to be protected in by Letters Patent, is:

A spring vehicle wheel, comprising the combination with an outer ring on which is the tire, said outer ring provided with an inner circumferential groove, a hub the middle portion of which corresponds in thickness to that of the wheel and is provided with a corresponding outer circumferential groove, springs one end of each of which is pin-connected within the groove of the wheel and the other end within the groove of the hub, the end of each spring being secured to a bearing tube through which the connecting pin passes, and a spring inclosing tube secured to each bearing tube, that of one end of the spring being telescopically slidable within that of the other.

In testimony whereof I have signed my name to this specification in the presence of two subscribing witnesses.

CHARLES WARWICK.

Witnesses:
ROWLAND BRITTAIN,
MAY WHYTE.